April 26, 1938.  O. H. HUNT  2,115,528
CONTROL APPARATUS
Original Filed Aug. 29, 1933
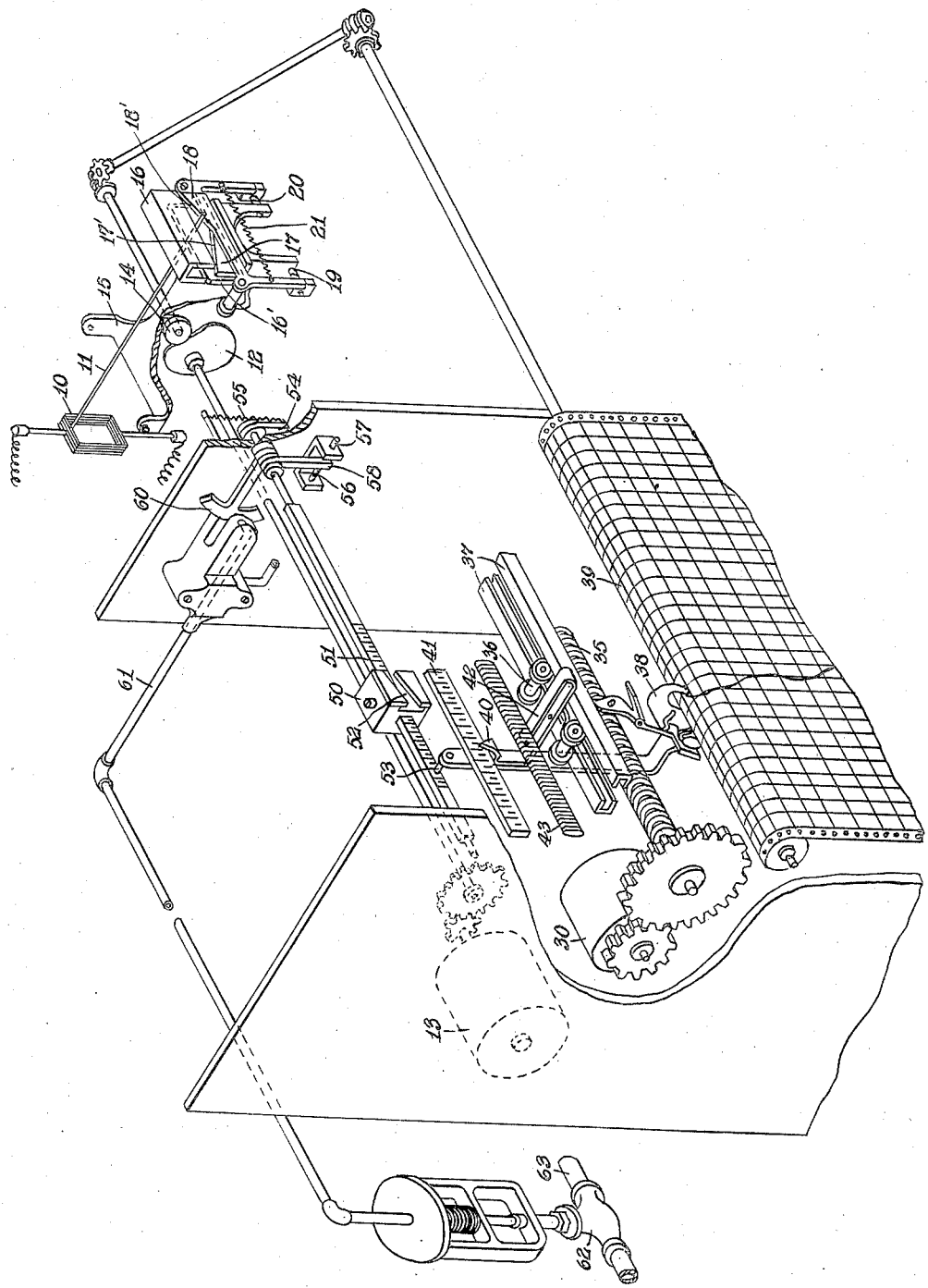
INVENTOR.
OZRO H. HUNT
BY
ATTORNEY.

Patented Apr. 26, 1938

2,115,528

UNITED STATES PATENT OFFICE 2,115,528

CONTROL APPARATUS

Ozro H. Hunt, Waterbury, Conn., assignor to The Bristol Company, Waterbury, Conn., a corporation of Connecticut Original application August 29, 1933, Serial No. 687,330. Divided and this application August 6, 1936, Serial No. 94,565

6 Claims. (Cl. 74—1)

The invention relates to control apparatus as embodied in a system of and apparatus for indicating and recording a physical, electrical, chemical, mechanical condition or quantity, or any other condition or quantity which may be represented by an electromotive force, and changes or variations therein; and more especially to the control or maintenance thereby of these conditions, and, for example, a system and apparatus of the type disclosed in U. S. Letters Patent #965,824 and #1,841,558.

In apparatus of this nature, a movable pointer, such as the indicator needle or pointer of a sensitive electrical measuring instrument, as a galvanometer, is actuated by variations in the condition to be measured and/or controlled through changes set up thereby in the applied electromotive force. While the pointer is free to move most of the time, it is also arranged to be periodically engaged, when deflected from a predetermined position, by means which serve to set in operation more substantial mechanism designed to record the magnitude of the condition and/or affect controlling mechanism of a nature to restore the altered condition to the desired predetermined state.

The invention has for an object the provision of novel means for effecting the control by apparatus of the aforesaid nature and including a potentiometer circuit with slider element operative under variations in the magnitude of an E. M. F.

The present application is a division of application Serial #687,330, filed by me August 29, 1933.

In carrying out the invention, the movable pointer member of a galvanometer or like measuring instrument, responding to changes in the condition to be controlled as through the effect of the condition upon a thermocouple or other electromotive force-producing element, is caused to be engaged (when deflected from a predetermined position as under voltage variations resulting from change in the condition) by means which are designed to control the circuit of a motor of the reversible type. This motor, when thus actuated, is designed to feed a carriage provided with a marker which is movable thereby over a suitable recording surface and in accordance with the magnitude of the variations. The particular position of the marker will then be a measure of the magnitude of the condition whose variation has influenced said pointer.

In addition, the movement of the carriage is arranged to be communicated to a contact-making element which is designed to move over a resistance. This resistance with its associated slidable contact-making element is in circuit with the electro-sensitive member subject to the condition under control, such as a thermocouple, the unbalanced portion of electromotive force developed by the couple serving as the force for actuating the pointer and the full value of which potential represents the condition under control. This control is effected through the operation of suitable control means actuated under the influence of a cam element adapted for engagement with a member movable with the said carriage as the same is positioned by the motor.

The nature of the invention, however, will best be understood when described in connection with the accompanying drawing, which illustrates, in perspective, the novel control means as embodied in potentiometer measuring apparatus.

Referring to the drawing, a sensitive measuring instrument such as a galvanometer is indicated at 10, the same being adapted in the present embodiment to respond to changes in electromotive force of a potentiometer or Wheatstone bridge circuit and caused by an element subject to the condition to be controlled. This galvanometer is designed to move a pointer element 11 in conformity with the changes in potential applied to the galvanometer, and the said pointer is arranged to move with respect to so-called "chopper" mechanism for operating additional circuits accordingly as the pointer moves to one side or the other of a neutral and predetermined position.

As shown, this mechanism comprises a cam 12 which is rotated at a constant speed from a motor 13 and is adapted to engage a cam follower 14 attached to an oscillatable bracket 15. This bracket carries the contact mechanism between which and a fixed or anvil member 16 pointer 11 is adapted to swing freely until the contact mechanism is elevated. The latter includes a pair of pivotally mounted chopper arms 17 and 18 having respective oppositely inclined surfaces 17' and 18', adapted for engagement with the pointer 11, and carrying respectively at their opposite ends the movable elements of cooperating contacts 19 and 20. When in the neutral predetermined position, pointer 11 will not necessarily be engaged by an inclined surface of the contact mechanism but when deflected to one side or the other thereof, one or the other of a pair of chopper arm surfaces 17' or 18' will contact therewith during the upward movement of the contact mechanism and operate one or the other of the contacts 19 or 20. As the contact mechanism is again depressed through further rotation of cam 12, a spring 21 serves to restore a contact to its normal position, which, in the present embodiment, is a closed position.

The contacts 19 and 20 are designed to control, in the present instance, the operation of a further motor 30 for a period proportional to the extent of said change and by increments whose magnitudes are dependent upon the extent of movement of said needle. The motor is of the reversible type and preferably of such a nature (see U. S. Patent #1,376,633) that when subjected to excitation in opposite senses from the two energizing circuits controlled by the contacts 19 and 20, respectively, the respective rotative efforts balance out, with no resultant tendency toward rotation.

Thus, the motor 30 remains inoperative so long as both the contacts 19 and 20 remain closed but when one or the other of the same is opened as hereinbefore set forth, the motor is operated in the corresponding direction. Motor 30 is designed, also, to drive a feed screw 35 and through the same the carriage 36 reciprocably mounted upon tracks 37. This carriage is designed to carry a marking pen 38 movable over a record chart 39 which is also driven through intermediate mechanism from the motor 13.

A further pointer 40 may move with the carriage 36 over a scale 41 for indicating the particular condition under control, and for calibration of the chart 39.

Furthermore, carriage 36 moves a slider contact 42 over a slide wire 43 with both of which the galvanometer coil 10 is so connected in circuit with a source or sources of E. M. F. that for certain values thereof, or resistance to be measured, there are corresponding positions on the slide wire 43 in which the galvanometer coil will not be deflected from its central position, as in the usual potentiometer circuits.

In addition, the carriage, through a continuation of the indicating arm 40, is caused to actuate a controlling mechanism for restoring the condition under measurement to a predetermined value and maintaining it substantially thereat. To this end, a control cam 50 is adjustably mounted along a rod 51 which is oscillatable about its longitudinal axis, the cam being provided with an obliquely disposed groove 52, either or both of the oblique sides of which may be operatively engaged by a pin 53 secured to the arm 40, so that as the control position is attained by the carriage 36 the pin 53 engaging the upper or the lower side of the groove, as the case may be, will correspondingly rock the rod 51 about its axis. A spring toggle mechanism embodying the arm 54 is secured to the rod 51 and the spring 55 is designed to hold the rod into an angular position at one side or the other of a middle position as the cam is caused to rotate the same beyond said middle position.

Adjustable stops 56 and 57 are arranged for engagement with an arm 58 secured to rod 51 to limit the throw in either direction. Rod 51 carries also a control or vane member 60 which is movable with the rod and is designed to control the pressure of a fluid medium within the piping system 61, as is more fully set forth in U. S. Letters Patent No. 1,880,247, in accordance with the throw of the rod. The pressure in piping 61, in turn, controls the operation of a valve 62 for regulating the supply, for example, of a heating medium through main 63, as is well understood and as is more fully set forth in the aforesaid Letters Patent, it being understood that the fuel supplied through the main 63 controls the condition under regulation by the aforesaid apparatus.

I claim:

1. In a device of the class described, and including a translatable element forcibly moved in response to a measured magnitude: a positive motion cam element, a member movable with the translatable element adapted for engagement with said cam to operate the same, and control means actuated by the said cam element.

2. In a device of the class described, and including a translatable element forcibly moved in response to a measured magnitude: a positive motion cam element adjustable in the direction of travel of the translatable element, a member movable with the translatable element adapted for engagement with said cam to operate the same, and control means actuated by the said cam element.

3. In a device of the class described, and including a translatable element forcibly moved in response to a measured magnitude: a positive motion cam element provided with a cam slot, a pin movable with the translatable element adapted for engagement with said cam slot to operate the cam element, and control means actuated by the said cam element.

4. In a device of the class described, and including a translatable element forcibly moved in response to a measured magnitude: a positive motion cam element, a member movable with the translatable element adapted for engagement with said cam to operate the same, control means actuated by operation of the cam element, and means for holding said control means in a fixed position upon actuation by the cam element and until reset by the latter.

5. In a controlling instrument including a translatable element forcibly moved in response to a measured magnitude: a positive-motion rockable cam element, a member movable with said element and adapted for engagement with said cam element to rock the same, and control means actuated by said cam element.

6. In a controlling instrument including a translatable element forcibly moved in response to a measured magnitude: a positive-motion rockable cam element having an oblique groove, and a member movable with said translatable element and adapted for engagement with said cam to rock the same, and control means actuated thereby.

OZRO H. HUNT.